Jan. 5, 1965 G. P. GALE 3,164,663
PROBE FOR COLORIMETRIC MEASUREMENT
Filed Oct. 27, 1960
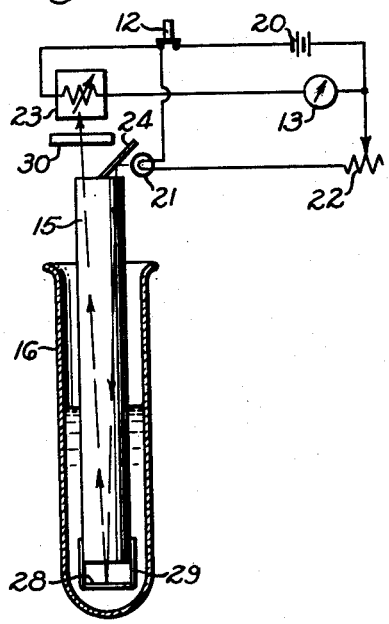
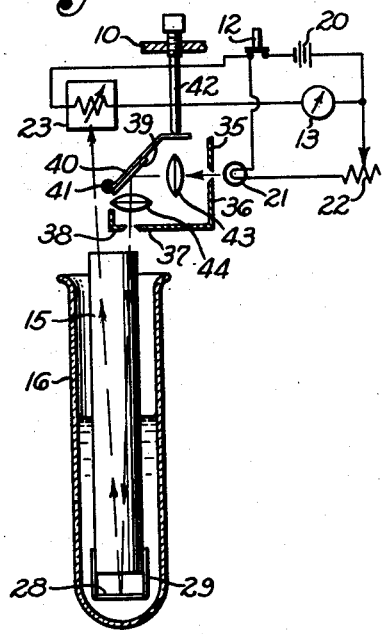
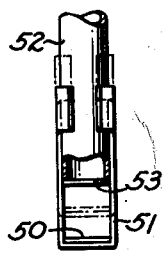
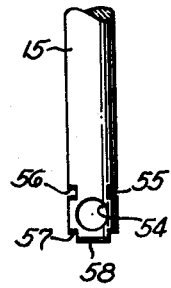
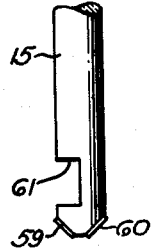
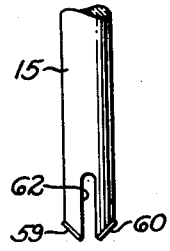
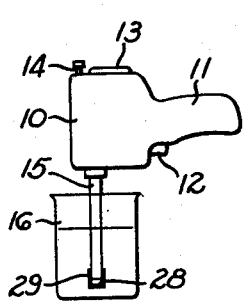
INVENTOR.
GEORGE P. GALE
BY HIS ATTORNEYS.
HARRIS, KIECH, RUSSELL & KERN United States Patent Office 3,164,663
Patented Jan. 5, 1965

3,164,663
PROBE FOR COLORIMETRIC MEASUREMENT
George P. Gale, Orange, Calif., assignor to Beckman Instruments, Inc., a corporation of California
Filed Oct. 27, 1960, Ser. No. 65,394
1 Claim. (Cl. 88—14)

This invention relates to an immersion probe for photoelectric measurements such as colorimetric measurements.

It is an object of the invention to provide a small, reliable and accurate immersion probe which is hand held and completely contained in a manually-manipulatable housing. A further object is to provide an immersion probe having an off-on switch for energization of the instrument and a single variable resistor for adjusting the reference level. Another object is to provide such an instrument incorporating circuitry for eliminating the problem of detector nonlinearity by permitting operation at a selected range of light intensity regardless of wavelength and sample density.

It is an object of the invention to provide an immersion-type photoelectric probe utilizing a single radiation conducting shaft for insertion into the sample. A further object is to provide such an instrument utilizing a solid transparent rod as the light-conducting shaft with the reflecting surface suspended from or attached to the projecting end of the rod. It is an object of the invention to provide such an immersion probe which eliminates the requirement for lenses or the like for collimation of light.

It is a particular object of the invention to provide an immersion probe which may be operated as a monochromater incorporating light slits and an optical dispersion element such as a prism or grating, with the dispersing element being movable to provide various wavelengths of operation.

It is an object of the invention to provide a potoelectric probe having a manually-supportable housing, a radiation conductor mounted in the housing and projecting therefrom for insertion into a fluid by manual manipulation of the housing, a radiation source mounted in the housing for directing a beam into the conductor, and a radiation sensing device mounted in the housing for receiving a beam from the conductor, with the conductor including radiation reflector means carried at the projecting end defining a radiation path from the source through the conductor to the reflector means and back through the conductor to the sensing device, and with the conductor having a gap therein adjacent the reflector means permitting the fluid to enter the radiation path.

It is an object of the invention to provide a photoelectric probe having a housing, a radiation conducting shaft mounted in the housing and projecting therefrom for insertion into a fluid, a radiation source mounted in the housing for directing a beam into the shaft, and a radiation sensing device mounted in the housing for receiving a beam from the shaft, with the shaft including radiation reflector means carried at the projecting end and defining a radiation path from the source through the shaft to the reflector means and back through the shaft to the sensing device, with the shaft having a gap therein adjacent the reflector means permitting the fluid to enter the path. A further object is to provide a photoelectric probe having various arrangements of reflectors and sample gaps including gaps having variable path lengths.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a side elevation of a preferred form of the invention;

FIG. 2 is a diagrammatic representation of the instrument of FIG. 1;

FIG. 3 is a view similar to that of FIG. 2 showing an alternative form of the instrument; and FIGS. 4 through 7 are alternative forms of the radiation conductor and reflector means.

The preferred form of the invention is shown in FIG. 1 and includes a housing 10 having a pistol grip or handle 11, a trigger switch 12 for energizing the electrical circuitry, an indicating meter 13, and adjustment knob 14 for the radiation intensity, and a radiation conductor 15 projecting from the housing for insertion into a sample container 16.

The circuitry of the instrument is shown in FIG. 2 and includes an electric power source such as a battery 20, a radiation source such as a lamp 21, and a variable resistor 22 which may be operated by the knob 14. The circuitry also includes a radiation-sensing device or light detector 23 of conventional design. The battery 20 is connected in series with the variable resistor 22, the lamp 21 and the switch 12. The battery is also connected in series with the meter 13, the radiation-detecting device 23 and the switch 12. The radiation conductor 15 is preferably a solid rod of glass or plastic such as the acrylic resin sold under the trademark Lucite, and the lamp 21 is positioned to direct a beam of radiation into the rod, preferably via a reflecting mirror 24.

A reflector, such as a polished surface 28 on a U-shaped clip 29, is carried at the projecting end of the rod 15. The instrument provides a radiation path from the source 21, down through the rod 15 to the reflecting surface 28 and back through the rod to the detector 23. A suitable filter 30 may be positioned in the radiation path if desired. The reflecting surface 28 is spaced from the end of the rod to provide a gap in the radiation path for receiving the sample fluid.

In the operation of the instrument, the probe is first inserted into a reference fluid and the meter indication noted or the resistor 22 adjusted to provide a predetermined meter indication. Then the probe is inserted into the sample and the meter indication is again noted, or the resistor is adjusted to provide the same reading with the amount of adjustment being noted. The difference in readings for the two tests provides a measure of the absorption of radiation by the sample. The instrument may be calibrated by using a number of known samples in the usual manner.

This structure provides a compact, portable unit suitable for colorimetric measurements throughout the laboratory and plant. The single-shaft probe simplifies the construction and operation of the instrument and substantially reduces the size of sample container with which the instrument may be operated. The solid-rod probe also eliminates the necessity of collimating lenses, tube seals and the like. The instrument is extremely simple to use, requiring only adjustment of the knob 14 and actuation of the trigger switch 12.

The circuitry of FIG. 2 permits use of radiation detectors which are nonlinear while eliminating the problems of nonlinearity. The excitation voltage at the lamp 21 may be adjusted by means of the variable resistor 22 to operate the detector 23 in the same range of light intensity during a series of measurements regardless of the wavelength utilized and the amount of arbsorption by the sample. This may be accomplished by adjusting the variable resistor setting at each measurement to provide the same indicated output, with the resistor setting providing the measure of the sample.

An alternative form of the instrument is shown in FIG. 3, wherein parts identical to those of FIGS. 1 and 2 are identified by the same reference numerals. Slit-defining jaws 35, 36 and 37, 38 are positioned between the lamp 21 and the rod 15. A radiation dispersing element such as a grating 39 is positioned between the slits and is mounted on a bracket 40 pivoted at a pin 41. An adjustment shaft 42 is threadedly mounted in the housing 10, providing for varying the angle of the grating with respect to the radiation path. A prism or other light-dispersing element can be substituted for the grating if desired. A collimating lens 43 is positioned between the first slit and the grating and a collecting lens 44 is positioned between the grating and the second slit. This arrangement provides a radiation source with a continuous selection of wavelength so that the instrument is a complete portable hand-held immersion probe with a monochromater.

A number of variations in the reflector construction are shown in FIGS. 4 through 7. In FIG. 4, a reflector 50 is mounted in a resilient, U-shaped member 51 which grips the conductor and supports the reflector spaced from the end of the conductor. The resilient member may be moved axially along the conductor to vary the path length in the sample. An alternative embodiment of the conductor in the form of a tube 52 is also shown in FIG. 4. In this embodiment, the lower end of the tube is closed by a flat window 53 sealed to the tube. The conductor may also be formed of a bundle of light-conducting fibers, which form is particularly suitable for bending to enable operation around an obstacle.

In the embodiment of FIG. 5, a transverse passage 54 is provided in the projecting end of the rod 15. Radiation paths around the passage are blocked by providing a groove 55 in the rod with the horizontal surfaces of the groove covered by an opaque material such as paint 56. A shoulder 57 may also be provided at the end of the rod with the horizontal surfaces painted to block light transmission. A reflector 58 is fixed at the end of the rod to reflect radiation back up the rod.

A wedge-shaped end is provided on the rod 15 in the embodiment of FIG. 6, and reflectors 59, 60 are mounted on the faces of the wedge to reverse the light path. A notch 61 is provided in the side of the rod to permit entry of the sample into the light path. The structure of FIG. 7 is similar to that of FIG. 6 with the reflectors 59, 60 mounted on the faces of the wedge-shaped end. A slot 62 is provided in the end of the rod permitting the sample to enter the radiation path between the two reflectors.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

In a photoelectric probe, the combination of: a housing; a radiation conductor mounted in said housing and projecting therefrom for insertion into a fluid; a radiation source mounted in said housing for directing a beam into said conductor; a radiation sensing device mounted in said housing for receiving a beam from said conductor, a bracket in the form of a U-shaped clip engaging and suspended from the projecting end of said conductor; radiation reflector means carried in said bracket in the light path and defining a radiation path from said source through said conductor to said reflector means and back through said conductor to said sensing means, said bracket being movable along said shaft to vary the spacing between said radiation reflector means and the projecting end of said conductor thereby defining a variable gap permitting fluid to enter said radiation path; an electric power source; an output indicating meter; a variable resistor; first circuit means for connecting said power source, said radiation source and said variable resistor in series for controlling the radiation intensity of said radiation source; and second circuit means for connecting said power source, said radiation sensing device and said meter in electrical series circuit.

References Cited in the file of this patent

UNITED STATES PATENTS

| | | |
|---|---|---|
| 1,806,199 | Hardy et al. | May 19, 1931 |
| 1,877,501 | Exton | Sept. 13, 1932 |
| 2,281,545 | Bennett et al. | May 5, 1942 |
| 2,324,304 | Katzman | July 13, 1943 |
| 2,727,997 | Schofield | Dec. 20, 1955 |
| 2,892,378 | Canada | June 30, 1959 |
| 2,922,891 | Turner et al. | Jan. 26, 1960 |
| 2,964,640 | Wippler | Dec. 13, 1960 |